(12) United States Patent
Carlhoff et al.

(10) Patent No.: US 7,259,838 B2
(45) Date of Patent: Aug. 21, 2007

(54) OPTICAL BEAM SEPARATION ELEMENT, MEASURING APPARATUS AND METHOD OF MEASURING

(75) Inventors: Christoph Carlhoff, Willich (DE); Stefan Kirchhoff, Dortmund (DE)

(73) Assignee: Specialty Minerals (Michigan) Inc., Bingham Farms, MI (US)

( * ) Notice: Subject to any disclaimer, the term of this patent is extended or adjusted under 35 U.S.C. 154(b) by 0 days.

(21) Appl. No.: 11/155,285

(22) Filed: Jun. 17, 2005

(65) Prior Publication Data

US 2006/0285103 A1 Dec. 21, 2006

(51) Int. Cl.
G01C 3/08 (2006.01)

(52) U.S. Cl. ............ 356/5.04; 356/5.01; 356/5.02

(58) Field of Classification Search .......... 356/5.06
See application file for complete search history.

(56) References Cited

U.S. PATENT DOCUMENTS

| 3,781,552 A * | 12/1973 | Kadrmas ............ 250/214 DC |
| 4,040,744 A | 8/1977 | Schertz et al. |
| 4,049,969 A | 9/1977 | Salonimer |
| 4,154,529 A * | 5/1979 | Dyott ................ 356/28 |
| 4,202,246 A | 5/1980 | Schertz et al. |
| 4,748,687 A | 5/1988 | Auracher et al. |
| 4,824,251 A | 4/1989 | Slotwinski et al. |
| 4,825,445 A | 4/1989 | Koop et al. |
| 4,860,303 A | 8/1989 | Russell |
| 4,895,440 A | 1/1990 | Cain et al. |
| 5,114,226 A | 5/1992 | Goodwin et al. |
| 5,137,354 A | 8/1992 | De Vos et al. |
| 5,170,276 A | 12/1992 | Zinser |
| 5,305,091 A * | 4/1994 | Gelbart et al. ............ 356/620 |
| 5,661,775 A | 8/1997 | Cramer et al. |
| 5,706,090 A | 1/1998 | Jokinen |
| 5,815,627 A | 9/1998 | Harrington |
| 5,943,459 A | 8/1999 | Hildebrand et al. |
| 6,208,774 B1 | 3/2001 | Sorin et al. |
| 6,456,435 B1 | 9/2002 | Cobb et al. |
| 6,795,245 B2 | 9/2004 | Xiao |
| 2002/0143506 A1 | 10/2002 | D'Aligny et al. |
| 2004/0042706 A1 | 3/2004 | Abe et al. |
| 2004/0184696 A1 | 9/2004 | Miao et al. |
| 2004/0184699 A1 | 9/2004 | Yeralan |

FOREIGN PATENT DOCUMENTS

| WO | WO 2004/068211 | 8/2004 |
| WO | WO 2004/077100 | 9/2004 |

* cited by examiner

*Primary Examiner*—Thomas H. Tarcza
*Assistant Examiner*—Luke Ratcliffe
(74) *Attorney, Agent, or Firm*—Leon Nigohosian, Jr.; Derek S. Jessen

(57) ABSTRACT

An optical beam separation element for a measuring apparatus includes a reflecting component with a reflecting surface and an aperture for forming an optical channel common to the transmission and the reception directions in the optical beam separation element. The reflecting surface of the reflecting component is positioned at an angle with respect to the optical channel. The aperture extends from the reflecting surface through the optical beam separation element allowing the optical beam to pass through the optical beam separation element to the optical channel in the transmission direction. The reflecting component separates the optical beams of the reception and the transmission directions.

10 Claims, 4 Drawing Sheets

OPTICAL BEAM SEPARATION ELEMENT, MEASURING APPARATUS AND METHOD OF MEASURING

The present invention relates to an optical beam separation element, a measuring apparatus and a measuring method.

A distance measuring apparatus can be a range finder based on a time-of-flight principle with two separate optical axes, a first axis for transmission and a second axis for reception. A laser of the measuring apparatus transmits an optical pulse through the first axis furnished with a suitable optical arrangement towards a desired object and an optical pulse reflected from the object is received through the second optical axis furnished with a suitable optical arrangement for receiving. The duration for the optical pulse to travel from the measuring apparatus to the object and back can be measured and the measured result can be transformed into distance on the basis of the speed of light.

Because of the two separate optical axes, the coverage area of the beam transmitted to the object is different from the coverage area which is observed through the second axis by the receiver. The difference in the coverage areas results in a loss of optical power in the measurement and in a low signal-to-noise ratio. The structure of the optical system also becomes complicated. For example, two objective lenses are needed, one for transmission and one for reception, and that makes the measuring head large.

Generally, beam splitters transmit 50% and reflect 50%. The arrangement combines the optical axes in the transmission and the reception directions for a co-axial operation. However, beam splitters of this kind waste optical power when splitting the beam. In the transmission direction, 50% at the maximum of optical power can be directed to the object through the co-axial arrangement and 50% at the maximum of optical power directed to the receiver can be received through the coaxial arrangement. Hence, if it is considered that all power of the transmitted optical pulse is reflected back, the theoretical maximum performance efficiency is only 25% (=50%·50%) which typically denotes a worse operation than with the two optical axes.

SUMMARY OF THE INVENTION

An optical beam separation element, measuring apparatus and measuring method are provided.

According to one aspect of the invention, there is provided an optical beam separation element for a measuring apparatus configured to transmit an optical beam towards an object in a transmission direction through the optical beam separation element, and to receive an optical beam reflected from the object in a reception direction through the optical beam separation element. The optical beam separation element includes a reflecting component with a reflecting surface and an aperture for forming an optical channel common to the transmission and the reception directions in the optical beam separation element. The reflecting surface of the reflecting component is positioned at an angle with respect to the optical channel. The aperture extends from the reflecting surface through the optical beam separation element and is configured to pass the optical beam through the optical beam separation element to the optical channel in the transmission direction. The reflecting component is configured to isolate the optical beam of the transmission direction from the optical beam of the reception direction by reflecting the optical beam of the reception direction arriving at the reflecting surface away from the optical beam of the transmission direction.

According to another aspect of the invention, there is provided a measuring apparatus configured to transmit an optical beam towards an object in a transmission direction through an optical beam separation element, and to receive an optical beam reflected from the object in a reception direction through the optical beam separation element. The optical beam separation element includes a reflecting component with a reflecting surface and an aperture for forming an optical channel common to the transmission and the reception directions in the optical beam separation element. The reflecting surface of the reflecting component is positioned at an angle with respect to the optical channel. The aperture extends from the reflecting surface through the optical beam separation element and is configured to pass the optical beam through the optical beam separation element to the optical channel in the transmission direction. The reflecting component is configured to isolate the optical beam of the transmission direction from the optical beam of the reception direction by reflecting the optical beam of the reception direction arriving at the reflecting surface away from the optical beam of the transmission direction.

According to another aspect of the invention, there is provided a measuring method wherein the method includes transmitting an optical beam towards an object in a transmission direction through an optical beam separation element and receiving an optical beam reflected from the object in a reception direction through the optical beam separation element. Transmitting includes passing the optical beam through an aperture that extends from the reflecting surface through the optical beam separation element to an optical channel common to the transmission and the reception directions. Receiving includes separating, by the reflecting component, the optical beam of the transmission direction and the optical beam of the reception direction by reflecting the optical beam of the reception direction arriving at the reflecting surface away from the optical beam of the transmission direction towards detection.

The foregoing and other aspects will become apparent from the following detailed description of the invention when considered in conjunction with the accompanying drawing figures.

The following non-limiting examples are merely illustrative of some embodiments of the present invention, and are not to be construed as limiting the invention, the scope of which is defined by the appended claims.

DETAILED DESCRIPTION OF THE INVENTION

Figure 1:
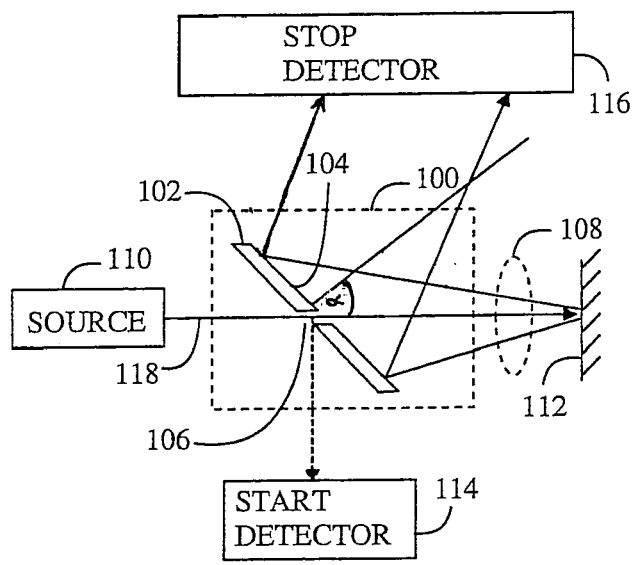
FIG. 1 illustrates an optical beam separation element.

With reference to FIG. 1, an example of an optical beam separation element 100 is illustrated. The optical beam separation element 100 can be used in a measuring apparatus that is configured to transmit an optical beam 118 towards an object 112 in a transmission direction through the optical beam separation element 100, and to receive an optical beam reflected from the object 112 in a reception direction. The optical beam separation element 100 may be a part of a measuring head of the measuring apparatus and can be placed far from the signal-processing and controlling unit of the measuring apparatus. In the present application, the optical beam refers to electromagnetic radiation at a wavelength band of from about 50 nanometers (nm) up to about 1 millimeter (mm). The transmission direction means a direction from an optical source 110 towards the object 112 and the reception direction means a direction from the object 112 towards a stop detector 116.

The optical source 110 may be a monochromatic optical source such as a laser, a narrow band optical source, such as a LED (Light Emitting Diode), or a wideband optical source, such as a glow lamp, an incandescent lamp, a halogen lamp, etc. The optical source 110 can transmit the optical beam as optical pulses, the duration of which may be, for example, from femtoseconds to nanoseconds.

The optical beam separation element may include a reflecting component 102 with a reflecting surface 104 and an aperture 106 for forming a common optical channel 108 common to the transmission and the reception directions in the optical beam separation element 100. The common optical channel 108 replaces the two separate optical axes. The reflecting component 102 may be a mirror or a prism wherein the reflecting component 102 reflects a small portion of the optical beam entering the optical component 100 to a start detector 114.

The reflecting surface 104 of the reflecting component 102 is positioned at an angle with respect to the common optical channel 108 and to the optical beam both in the transmission and the reception directions. The normal of the reflecting surface 104 with respect to the direction of the optical beam 118 has an angle α, the value of which differs from zero. A possible value for the angle is, for example, around 45 degrees, but is not limited to this.

The aperture 106 extends from the reflecting surface 104 through the optical beam separation element 100 for passing the optical beam 118 of the transmission direction through the optical beam separation element 100 to the common optical channel 108.

The reflecting surface 104 of the reflecting component 102 is configured to isolate the optical beam 118 of the transmission direction and the optical beam of the reception direction by reflecting the optical beam of the reception direction arriving on the reflecting surface 104 away from the optical beam of the transmission direction. A small portion of less than 1% of the optical beam of the reception direction passes through the aperture 106 towards the optical source 110, while greater than 99% of the power of the optical beam of the reception direction, is deviated from propagating back to the optical source 110. The reflecting surface 104 reflects the optical beam of the reception direction to a stop detector 116 of the measuring apparatus.

Figure 2:
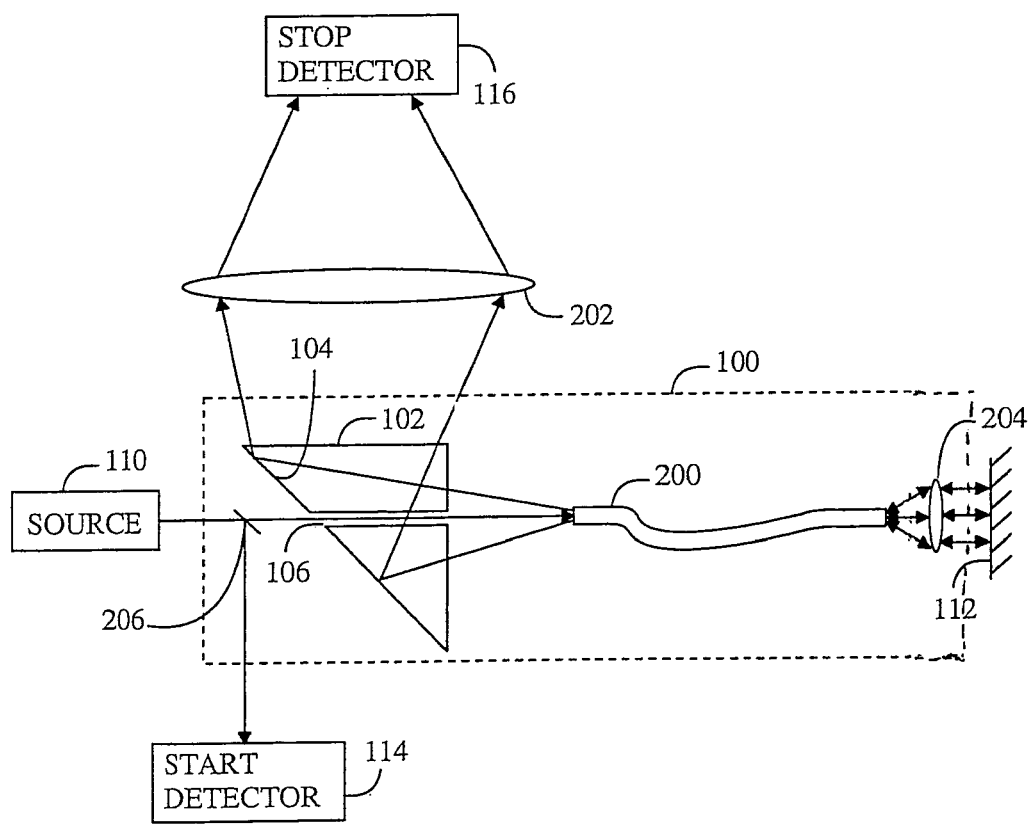
FIG. 2 illustrates an optical beam separation element with an optical fiber.

FIG. 2 illustrates an optical beam separation element with some additional features. In this example, the reflecting component is illustrated as a prism. The optical beam separation element 100 can further comprise an optical fiber 200 as a medium for a section of the common optical channel. The optical fiber 200 receives the optical beam from the aperture 106 in the transmission direction. The optical fiber 200 guides the optical beam towards the object 112. The optical beam leaving the optical fiber 200 for the object 112 is focused or collimated by a transceiving optical unit 204 which may include at least one lens. This approach also enables the use of telecentric optics.

After hitting and reflecting the object 112, at least a part of the optical beam arrives back at the transceiving optical unit 204 which focuses the optical beam to the optical fiber 200 to be guided towards the reflecting component 102. The optical fiber 200 outputs the optical beam in a solid angle of the numerical aperture of the optical fiber 200 to the reflecting surface 104 in the reception direction. As the area of the reflecting surface 104 covered by the optical beam of the reception direction can be made much larger than the area of the aperture 106, almost all of the power of the optical beam of the reception direction reflects towards a receiving optical unit 202. Let us assume that the radius of a circular aperture is r and the radius of a circular area of the optical beam on the reflecting surface is R. The loss of optical power then relates to $r^2/R^2$. If $R=10r$, then the loss caused by the aperture is only 1 percent. The reflecting surface 104 reflects the optical beam to a receiving optical unit 202, which may include a lens or lenses. The receiving optical unit 202 focuses or collimates the optical beam to the stop detector 116. The optical beam separation element may include a separate start reflector 206 which reflects a fraction of the optical beam 118 of the transmission direction to the start detector 114.

Figure 3:
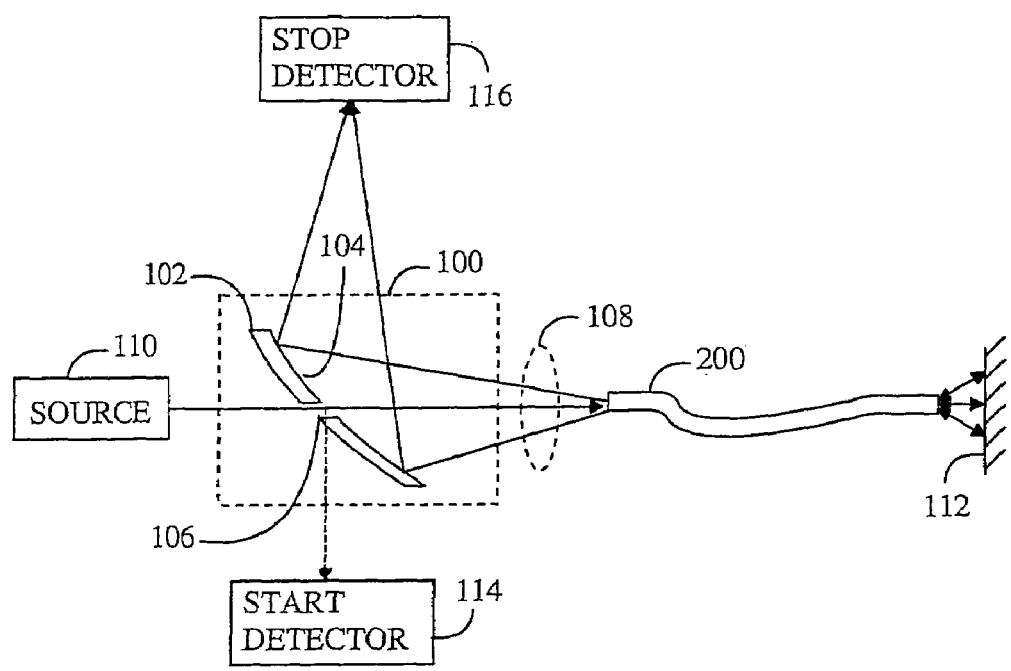
FIG. 3 illustrates an optical beam separation element with a concave reflector.

FIG. 3 illustrates an optical beam separation element 100 with a concave reflecting surface 104. The form of the surface can be considered concave if it is curved inward and it converges the optical beam of the reception direction. In this solution, the receiving optical unit 202 shown in FIG. 2 can be eliminated. The optical beam coming from the optical fiber 200 can be focused to the stop detector with the concave reflecting surface 104 of the reflecting component 102. However, it is also possible that a concave reflecting surface 104 and a suitable lens are used together to direct the optical beam to the stop detector 116.

Figure 4A:
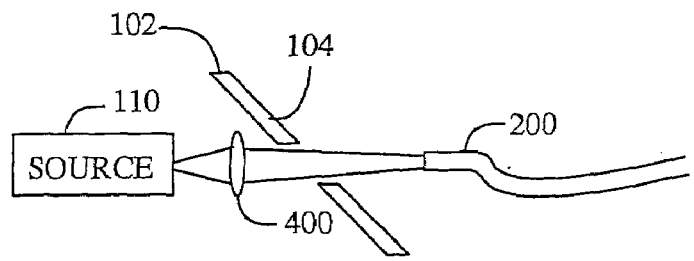
FIG. 4A illustrates the aperture optical component in front of the aperture.
Figure 4B:
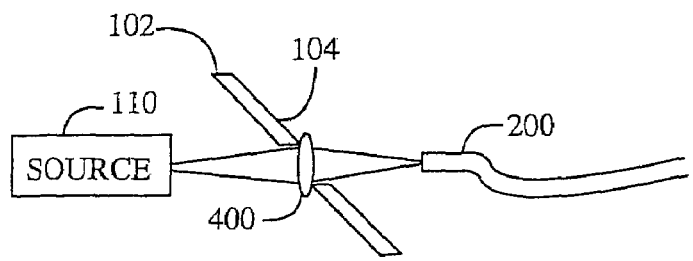
FIG. 4B illustrates the aperture optical component inside the aperture.

FIG. 4A and FIG. 4B illustrate an optical beam separation element 100 with an aperture optical component 400 which may include a lens or lenses. As shown in FIG. 4A, the aperture optical component 400 is placed in the frontal part of the optical beam separation element 100 such that the optical beam entering the optical beam separation element 100 first hits the aperture optical component 400 in the front of the aperture 106 and then the optical beam passes through the aperture 106. The aperture optical component 400 focuses or collimates the optical beam such that the optical beam can pass through the aperture 106 with a small loss or without a loss and the optical beam can be transmitted through the optical fiber 200 with high efficiency. Hence, the aperture optical component 400 keeps the diameter of the optical beam narrower than the diameter of the aperture 106 and the diameter of the core of the optical fiber 200. The aperture optical component 400 may also be used to control the optical beam entering the optical fiber 200 in the transmission direction to arrive within the acceptance angle of the optical fiber 200.

FIG. 4B, illustrates a configuration where the aperture optical component 400 is placed inside the aperture of the reflecting component 102. The aperture optical component 400 focuses or collimates the optical beam such that the optical beam propagates with little or no loss to the optical fiber 200.

Figure 5:
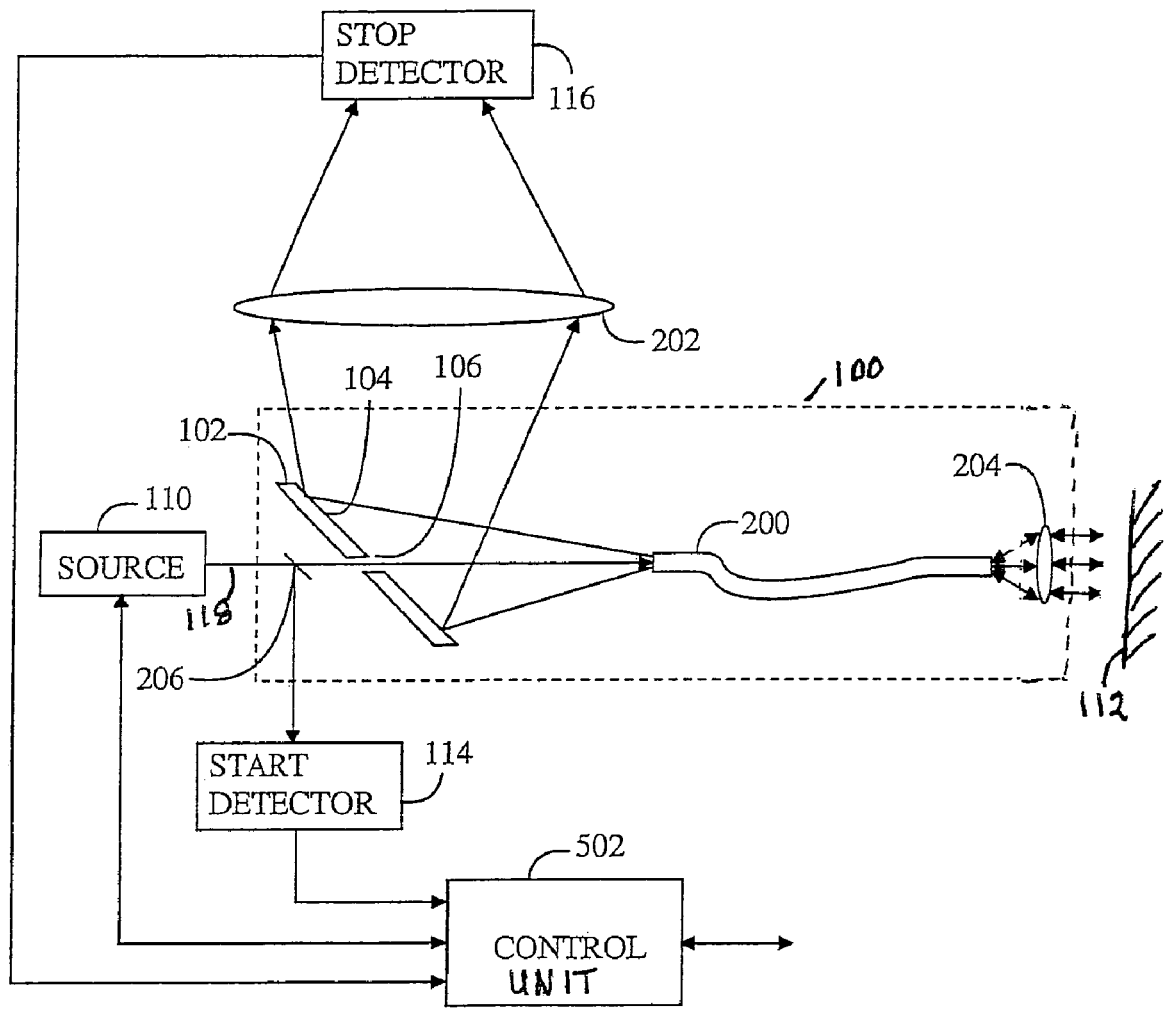
FIG. 5 illustrates a measuring apparatus.

FIG. 5 illustrates a measuring apparatus based on a time-of-flight principle. The optical beam 118 of the transmission direction is transmitted from an optical source 110 to the optical beam separation element 100. The optical beam travels to a start reflector 206, which reflects a fraction of the optical beam to a start detector 114. The start detector 114 detects the fraction of the optical beam, which may vary from some percentages to a billionth part (or even smaller) in power, and feeds a corresponding electrical signal to a control unit 502 which forms a start mark $t_1$ for the pulse of the optical beam. The start mark $t_1$ defines the moment of departure of the optical pulse from the measuring apparatus.

The optical beam is transmitted to the object 112 which reflects a part of the optical beam back to the optical beam separation element 100. The optical beam separation element 100 passes the received optical beam to the stop detector 116. As the measuring apparatus is suitable for measuring hot surfaces and objects with high absorption properties without the need for attaching reflectors, the object 112 may be a hot steel-processing vessel, such as, but not limited to, a ladle or a converter. The stop detector 116 detects the received optical beam and feeds a corresponding electrical signal to a control unit 502 which forms a stop mark $t_2$ for the pulse of the received optical beam. The stop mark $t_2$ defines the moment of arrival of the optical pulse at the measuring apparatus. The control unit 502 calculates a timing difference $\Delta t = t_2 - t_1$ of the start mark and the stop mark and determines the distance D between the object 112 and the measuring apparatus as a function of the timing difference, $D = f(\Delta t)$. In a simple model the dependence between the distance D and the timing difference $\Delta t$ is linear, i.e. $D = c\Delta t$, where c is a constant (half the speed of light). In the case of the object 112 being a hot steel-processing vessel, the changes in the thickness of the wall of the vessel can be measured as the wall wears, which can be observed through increases in distance.

Figure 6:
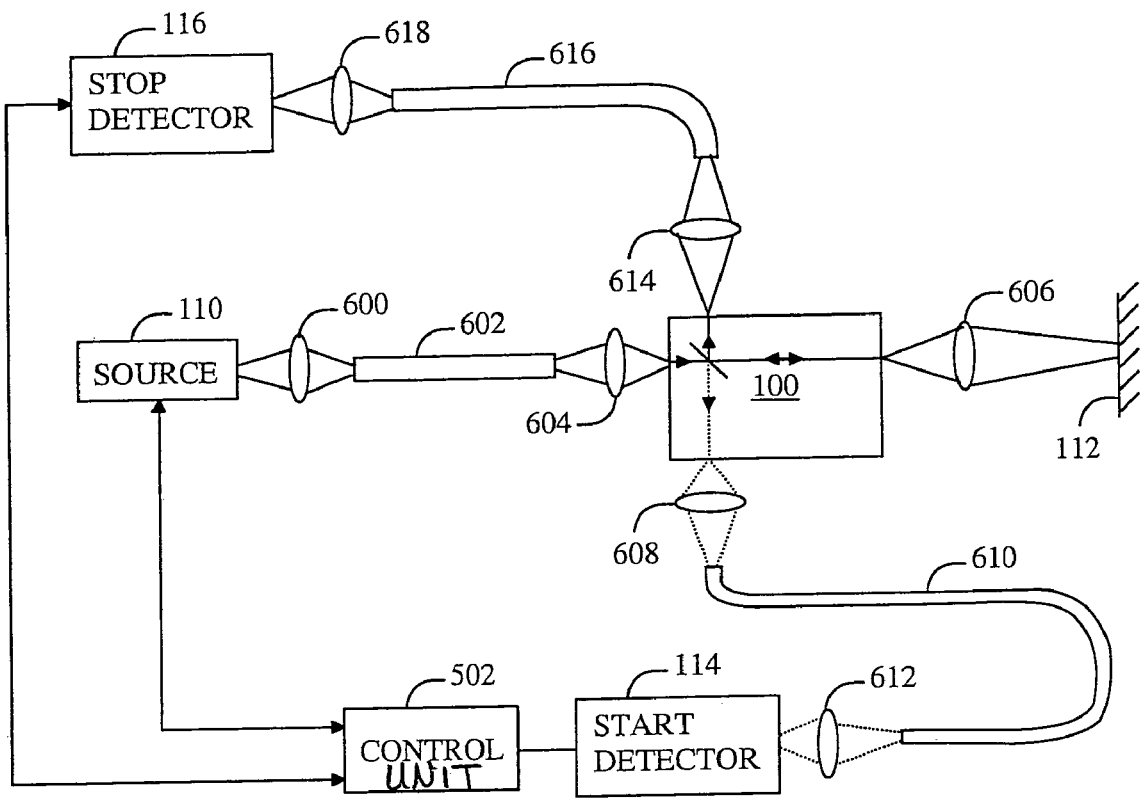
FIG. 6 illustrates a measuring apparatus with optical fibers.

FIG. 6 represents a measuring apparatus utilizing optical fibers external to the optical beam separation element 100. The optical beam from the optical source 110 is focused in a transmitting fiber 602 by a first optical unit 600. The optical beam leaving the transmitting fiber 602 is focused to the optical beam separation element 100 by a second optical unit 604 which may be the same as the aperture optical component 400 (FIG. 4A and FIG. 4B). The optical beam transmitted from the optical beam separation element 100 is focused or collimated towards the object 112 by a third optical unit 606 which may be the same as the transceiving optical unit 204 (see FIG. 2 and FIG. 5). The optical beam reflecting towards the start detector 114 is focused to a start fiber 610 by a fourth optical unit 608. The start beam propagating out of the start fiber 610 is focused to the start detector 114 by a fifth optical unit 612. The received optical beam from the object 112 is focused to a receiving fiber 616 by a sixth optical unit 614. Finally, the received optical beam leaving the receiving fiber 616 is focused to the stop detector 116 by a seventh optical unit 618. The optical units 600, 604, 606, 608, 612, 614, 618 from the first to the seventh may include at least one lens for focusing or collimating the optical beam. Additionally, any of the optical units 600, 604, 606, 608, 612, 614, 618 may include at least one optical filter for limiting the optical band.

Figure 7:
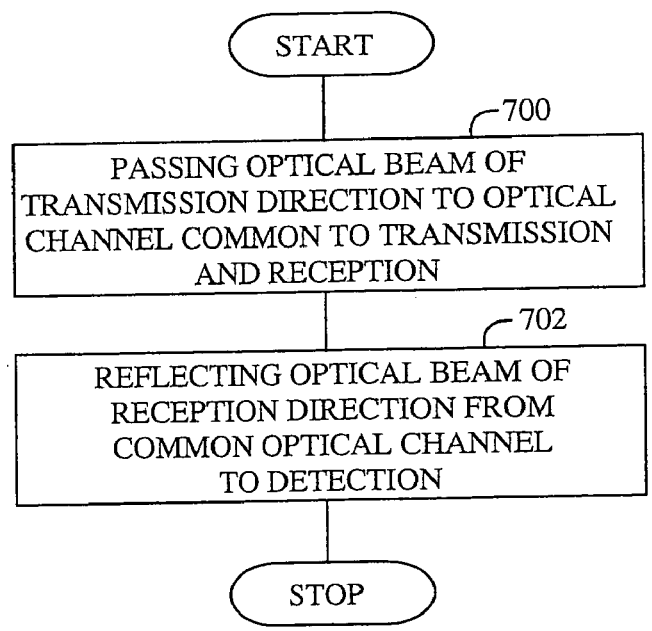
FIG. 7 illustrates a flow chart of the method in the transmission direction.

FIG. 7 illustrates a flow chart of the measuring method. In step 700, when an optical beam is transmitted towards an object in a transmission direction through the optical beam separation element, the optical beam is passed through an aperture extending from the reflecting surface through the optical beam separation element to an optical channel common to the transmission and the reception directions. In step 702, when the optical beam arrives on the reflecting surface from the common optical channel, the optical beam is reflected towards detection by the reflecting surface of the reflecting component positioned at an angle with respect to the optical channel.

The optical beam separation element of the measuring apparatus enables the measurement range or the range of optimum signal or the range of maximum signal-to-noise ratio to not be limited to overlapping coverage areas of transmission and reception, as in the case for two-axial optics. The loss of optical power is minimal and theoretically much less than in a conventional measurement. A more accurate measurement can be accomplished using the measuring apparatus described above than with two-axial measurement.

Additionally, as the distribution of a laser beam is inhomogeneous transversally and longitudinally, the effect combined with the variation of target emissivity is extremely difficult to compensate for in a two-axial measurement. The use of telecentric optics eliminates distance-dependent aberrations in transmission and reception.

Even though the invention is described above with reference to examples according to the accompanying drawings, it is clear that the invention is not restricted thereto but can be modified in several ways within the scope of the appended claims.

The invention claimed is:

1. An optical beam separation element for a measuring apparatus configured to transmit an optical beam towards an object in a transmission direction through the optical beam separation element, and to receive an optical beam reflected from the object in a reception direction through the optical beam separation element, wherein the optical beam separation element comprises:
   a reflecting component with a reflecting surface and an aperture for forming an optical channel common to the transmission and the reception directions in the optical beam separation element;
   the reflecting surface of the reflecting component being positioned at an angle with respect to the optical channel;
   the aperture extending from the reflecting surface through the optical beam separation element being configured to pass the optical beam through the optical beam separation element to the optical channel in the transmission direction;
   the reflecting component being configured to isolate the optical beam of the transmission direction and the optical beam of the reception direction by reflecting the optical beam of the reception direction arriving at the reflecting surface away from the optical beam of the transmission direction; and
   an aperture optical component for focusing or collimating the optical beam of the transmission direction to the common optical channel wherein the aperture optical component is placed in the aperture of the reflecting component.

2. An optical beam separation element for a measuring apparatus configured to transmit an optical beam towards an object in a transmission direction through the optical beam separation element, and to receive an optical beam reflected from the object in a reception direction through the optical beam separation element, wherein the optical beam separation element comprises:

a reflecting component with a reflecting surface and an aperture for forming an optical channel common to the transmission and the reception directions in the optical beam separation element;

the reflecting surface of the reflecting component being positioned at an angle with respect to the optical channel;

the aperture extending from the reflecting surface through the optical beam separation element being configured to pass the optical beam through the optical beam separation element to the optical channel in the transmission direction;

the reflecting component being configured to isolate the optical beam of the transmission direction and the optical beam of the reception direction by reflecting the optical beam of the reception direction arriving at the reflecting surface away from the optical beam of the transmission direction; and an aperture optical component for focusing or collimating the optical beam of the transmission direction to the common optical channel wherein the aperture optical component is placed in the front of the aperture of the reflecting component.

3. An optical beam separation element for a measuring apparatus configured to transmit an optical beam towards an object in a transmission direction through the optical beam separation element, and to receive an optical beam reflected from the object in a reception direction through the optical beam separation element, wherein the optical beam separation element comprises:

a reflecting component with a reflecting surface and an aperture for forming an optical channel common to the transmission and the reception directions in the optical beam separation element;

the reflecting surface of the reflecting component being positioned at an angle with respect to the optical channel;

the aperture extending from the reflecting surface through the optical beam separation element being configured to pass the optical beam through the optical beam separation element to the optical channel in the transmission direction;

the reflecting component being configured to isolate the optical beam of the transmission direction and the optical beam of the reception direction by reflecting the optical beam of the reception direction arriving at the reflecting surface away from the optical beam of the transmission direction;

wherein the reflecting surface of the reflecting component is concave for focusing or collimating the optical beam reflected away from the common optical channel.

4. A measuring apparatus configured to transmit an optical beam towards an object in a transmission direction through an optical beam separation element, and to receive an optical beam reflected from the object in a reception direction through the optical beam separation element, wherein the optical beam separation element comprises:

a reflecting component reflecting surface and an aperture for forming an optical channel common to the transmission and the reception directions in the optical beam separation element;

the reflecting surface of the reflecting component being positioned at an angle with respect to the optical channel wherein the reflecting surface of the reflecting component is concave for focusing or collimating the optical beam reflected from the reflecting surface in the reception direction;

the aperture extending from the reflecting surface through the optical beam separation element being configured to pass the optical beam through the optical beam separation element to the optical channel in the transmission direction; and the reflecting component being configured to isolate the optical beam of the transmission direction and the optical beam of the reception direction by reflecting the optical beam of the reception direction arriving at the reflecting surface away from the optical beam of the transmission direction.

5. A measuring apparatus configured to transmit an optical beam towards an object in a transmission direction through an optical beam separation element, and to receive an optical beam reflected from the object in a reception direction through the optical beam separation element, wherein the optical beam separation element comprises:

a reflecting component with a reflecting surface and an aperture for forming an optical channel common to the transmission and the reception directions in the optical beam separation element;

the reflecting surface of the reflecting component being positioned at an angle with respect to the optical channel;

the aperture extending from the reflecting surface through the optical beam separation element being configured to pass the optical beam through the optical beam separation element to the optical channel in the transmission direction;

the reflecting component being configured to isolate the optical beam of the transmission direction and the optical beam of the reception direction by reflecting the optical beam of the reception direction arriving at the reflecting surface away from the optical beam of the transmission direction;

an optical fiber as a medium of the optical channel, the optical fiber being configured to receive the optical beam from the aperture in the transmission direction and to output the optical beam onto the reflecting surface in the reception direction; and an optical aperture unit for focusing or collimating the optical beam from the optical source to the optical fiber in the transmission direction, the optical aperture unit being placed between the optical source and the aperture of the reflecting component.

6. A measuring apparatus configured to transmit an optical beam towards an object in a transmission direction through an optical beam separation element, and to receive an optical beam reflected from the object in a reception direction through the optical beam separation element, wherein the optical beam separation element comprises:

a reflecting component with a reflecting surface and an aperture for forming an optical channel common to the transmission and the reception directions in the optical beam separation element;

the reflecting surface of the reflecting component being positioned at an angle with respect to the optical channel;

the aperture extending from the reflecting surface through the optical beam separation element being configured to pass the optical beam through the optical beam separation element to the optical channel in the transmission direction;

the reflecting component being configured to isolate the optical beam of the transmission direction and the optical beam of the reception direction by reflecting the optical beam of the reception direction arriving at the reflecting surface away from the optical beam of the transmission direction;

an optical fiber as a medium of the optical channel, the optical fiber being configured to receive the optical beam from the aperture in the transmission direction and to output the optical beam onto the reflecting surface in the reception direction; and an optical aperture unit for focusing or collimating the optical beam from the optical source to the optical fiber in the transmission direction, the optical aperture unit being placed in the aperture of the reflecting component.

7. The optical beam separation element of claim 2 wherein the reflecting component is a concave mirror.

8. The optical beam separation element of claim 3 wherein the reflecting component is a concave mirror.

9. The measuring apparatus of claim 4 wherein the reflecting component is a concave mirror.

10. The measuring apparatus of claim 5 wherein the reflecting component is a concave mirror.

* * * * *